July 25, 1961   R. L. ARDNER   2,993,383
RATCHET ADJUSTER FOR A VARIABLE SPEED DRIVE
Filed Aug. 11, 1958   2 Sheets-Sheet 1

INVENTOR.
Robert L. Ardner
BY
Bair, Freeman & Molinare
Attys.

July 25, 1961 R. L. ARDNER 2,993,383
RATCHET ADJUSTER FOR A VARIABLE SPEED DRIVE
Filed Aug. 11, 1958 2 Sheets-Sheet 2
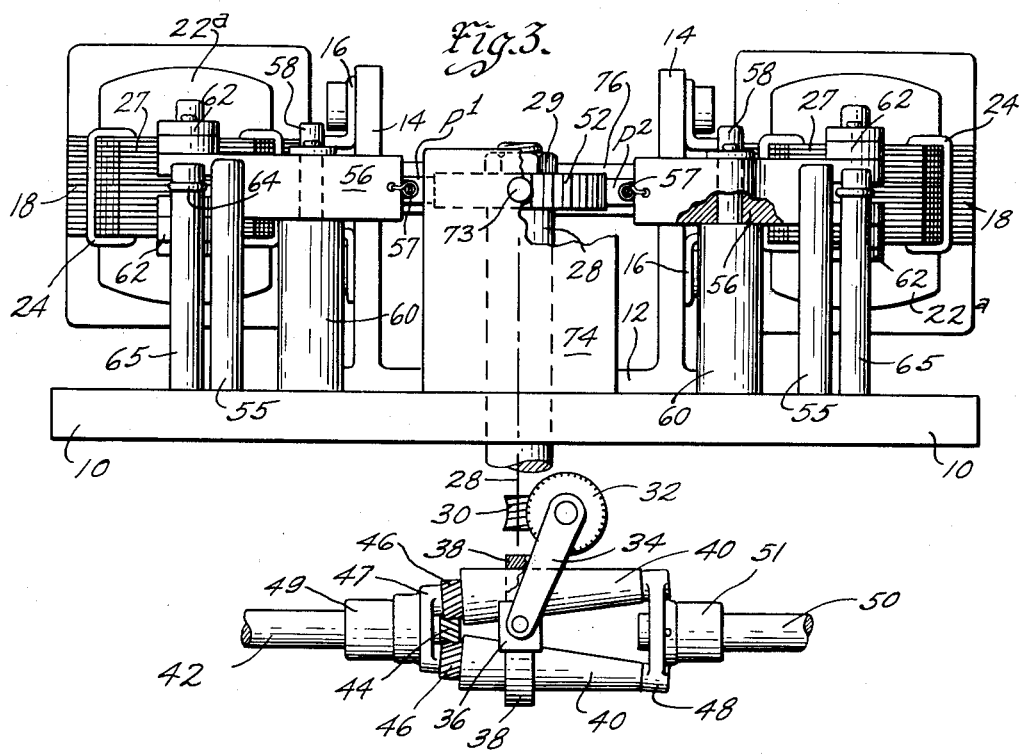
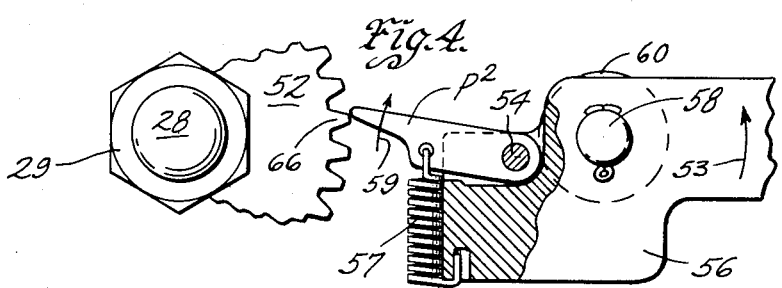
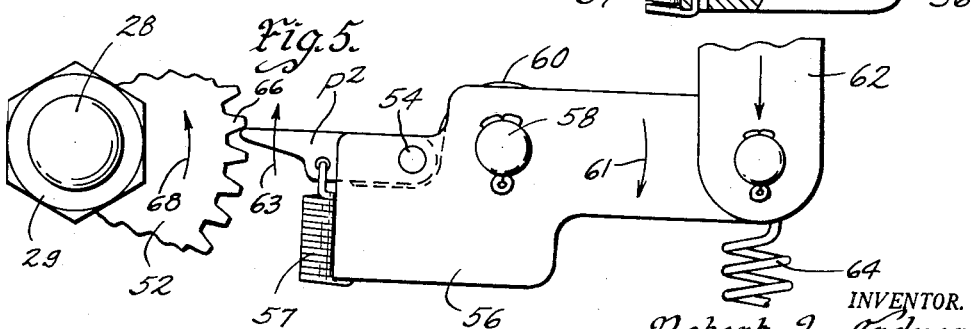
INVENTOR.
Robert L. Ardner
BY
Bair, Freeman & Molinare
Attys.

United States Patent Office 2,993,383
Patented July 25, 1961

2,993,383
RATCHET ADJUSTER FOR A VARIABLE SPEED DRIVE
Robert L. Ardner, Anderson, Ind., assignor to Lynch Corporation
Filed Aug. 11, 1958, Ser. No. 754,416
2 Claims. (Cl. 74—142)

This invention relates to an adjuster for a variable speed drive and contemplates the use of an electrically operated ratchet mechanism that can be rotated in either direction for either increasing or decreasing the speed of the variable speed drive.

One object of the invention is to provide ratchet mechanism for an adjusting shaft of a variable speed drive such as one of the planetary cone-friction-ring type wherein a ratchet wheel is provided on the adjusting shaft of the drive and a pair of actuating pawls are provided therefor, one to rotate the ratchet wheel in one direction and the other to rotate it in the opposite direction, the pawls being individually operable by solenoids or the like.

Another object is to provide pawls that so coact with the ratchet wheel that they are free of the wheel to permit its manual rotation in either direction without interference by the pawls or to permit its rotation by energization of either of the solenoids without interference by the actuating pawl of the other solenoid.

Still another object is to provide a ratchet adjuster for a variable speed drive that is particularly adapted for automatically adjusting the drive of an article feeding means of a wrapping machine or the like in response to electric eye mechanism that is responsive to registration means or "eye spots" on a web of wrapping material as disclosed in my co-pending application, Serial No. 754,425, filed August 11, 1958.

A further object is to provide an interconnection between the pawls for preventing lock-up of the ratchet wheel in the event both solenoids are energized at the same time.

With these and other objects in view, my invention consists in the construction, arrangement and combination of the various parts of my ratchet adjuster for variable speed drives, whereby the objects above contemplated are attained, as hereinafter more fully set forth, pointed out in my claims and illustrated in detail on the accompanying drawing, wherein:

FIG. 3 is a front elevation thereof looking at the bottom edge of FIG. 1 and shows diagrammatically a variable speed drive to be adjusted thereby;

FIG. 4 is an enlarged detail view of a portion of FIG. 1 showing one of the actuating pawls being actuated by energization of its respective solenoid; and FIG. 5 is a similar view showing a further step in the operation of the actuating pawl of FIG. 4.

Figure 2:
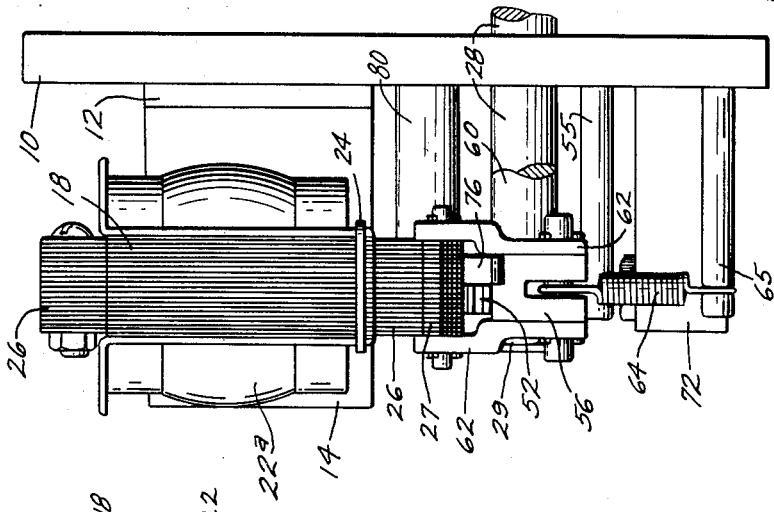
FIG. 2 is an end elevation thereof looking at the right-hand end of FIG. 1.

On the accompanying drawings I have used the reference numeral 10 to indicate a suitable base on which the mechanism of my ratchet adjuster is mounted. A bracket 12 having upstanding portions 14 is secured to the base 10, and supports (by means of a pair of brackets 16) a pair of solenoid cores 18. These are provided with the usual plunger guide tubes 20 in which plungers 26 may slide, and solenoid coils 22 surround the tubes 20 and are enclosed in housings 22ª. Suitable shading coils 24 may be provided on the cores 18 so that the solenoids 18—26 may be suitably energized by A.C. current and it will be noted that the cores 18 are also laminated for this purpose.

A variable speed drive adjuster shaft 28 is illustrated and in FIG. 3 it is shown diagrammatically connected to a variable speed drive of the planetary-cone-friction-ring type wherein an input shaft 42 drives a sun gear 44 with which planet gears 46 mesh. The gears 46 are formed on the ends of tapered or cone-shaped friction rollers. In place of the usual ring gear, the planetary assembly shown includes a friction ring 38 which surrounds the tapered rollers 40 and frictionally engages their surfaces. The rollers are so arranged angularly with respect to the axis of rotation of the variable speed drive as to have the outer extremities of their surfaces with respect to said axis parallel thereto. The planet gears 46 and rollers 40 are journalled in end plates 47 and 48 that rotate about the axis of the drive, and the end plate 48 has an output shaft 50 connected therewith which accordingly rotates at a reduced speed relative to the input shaft 42. Bearings 49 and 51 are shown for the shafts 42 and 50 to rotate in. The speed ratio can be infinitely varied within the range of the variable speed drive by shifting the friction ring 38 along the rollers 40 toward either the large ends thereof (left-hand ends) to decrease the speed or toward the right-hand ends to increase the speed. The ring 38 is held against rotation by opposite shoes 36 and these shoes are adjusted as by arms 34 on a worm gear 32 that meshes with a worm 30 on the adjusting shaft 28.

Referring again to FIG. 1, a ratchet wheel 52 is mounted on the adjusting shaft 28 as by a nut 29 and is normally held in the position shown by a detent pin 70 under the bias of a spring 72 in a block 74. A plug 73 (FIG. 3) backs up the spring. From the description of the variable speed drive in FIG. 3 it will be obvious that rotation of the ratchet wheel 52 in one direction will increase the speed ratio of the variable speed drive whereas rotation in the opposite direction will decrease it. This can be done in small increments by proper cooperation of actuating pawls P¹ and P² with the ratchet wheel 52, and by proper operation of these pawls as will hereinafter appear.

The pawls P¹ and P² are pivoted at 54 to pawl carriers 56 which in turn are pivoted on pins 58 extending upwardly from posts 60. The posts 60 as shown in FIG. 3 extend upwardly from the base 10 and have their lower ends anchored therein.

Figure 1:
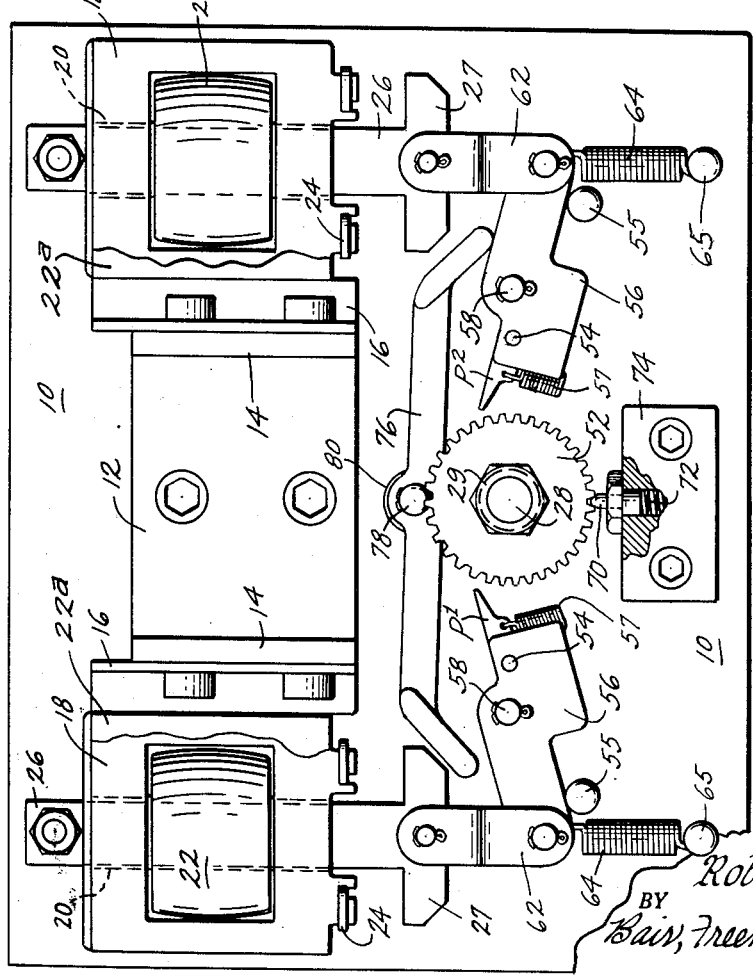
FIG. 1 is a plan view of a ratchet adjuster embodying my invention, the adjuster being adaptable for a variable speed drive.

The pawl carriers 56 are connected by links 62 to the solenoid plungers 26 and are normally retained in the positions shown in FIG. 1 against stop posts 55 by return springs 64 connected to posts 65. It is obvious, therefore, that energization of either of the coils 22 will draw its respective plunger 26 upwardly against the action of its spring 64 until the T head 27 on the lower end of the plunger engages the core 18 adjacent the shading coils 24. This is illustrated in FIGS. 4 and 5 wherein FIG. 4 shows an intermediate position with the pawl P² having engaged a tooth 66 of the ratchet wheel 52 and being about ready to slip off the end thereof as the pawl moves further downward. The carrier 56 is swinging about the axis 58 in the direction of the arrow 53 while the pawl is swinging about the axis 54 in the direction of the arrow 59. In FIG. 5 the pawl carrier has completed its movement in the direction of the arrow 53 and the pawl has taken up a position under the action of a spring 57 beneath this particular tooth 66. Accordingly, when the right-hand coil 22 is de-energized the right-hand spring 64 will return the pawl carrier 56 (arrow 61 about axis 58) to its initial position shown in FIG. 1 and in so doing the pawl P² will lift (arrow 63 about axis 58) the right-hand side of the ratchet wheel 52 one tooth, thus rotating it counterclockwise (arrow 68) one angular increment of adjustment as represented by the distance between two adjacent teeth on the ratchet wheel.

In my copending application, under normal conditions only one solenoid coil 22 is energized at a time but in case of loss of the "eye spot" on the wrapper both would be energized and if that happened both pawls P¹ and P² could assume the position shown in FIG. 5 and lock up the ratchet wheel against further rotation either manually or automatically. To provide against such malfunctioning of the ratchet adjuster I provide a rocker bar 76 freely pivoted at 78 on a post 80. When one pawl carrier is actuated by its solenoid, energization of the other solenoid cannot actuate its respective pawl carrier which will be blocked against operation by the rocker bar 76.

Some changes may be made in the construction and arrangement of the parts of my ratchet adjuster for a variable speed drive without departing from the real spirit and purpose of my invention, and it is my intention to cover by my claims any modified forms of structure or use of mechanical equivalents which may reasonably be included within their scope.

I claim as my invention:

1. In a ratchet adjuster for a variable speed drive having an adjusting shaft, a ratchet wheel on said shaft, detent means normally retaining said ratchet wheel against rotation, and means for selectively rotating said ratchet wheel in either direction comprising a pair of individual pawl carriers, each pivotally mounted for limited oscillation from and to normal positions, pawls pivoted thereto and normally out of engagement with said ratchet wheel, spring means biasing said pawl carriers to said normal positions, and a solenoid for each pawl carrier to move it from its normal position to its opposite limit of movement and ratcheting its pawl past the teeth of said ratchet wheel during such movement, said spring means returning said pawl carriers to their normal positions upon de-energization of said solenoids and effecting movement of said ratchet wheel by said pawls during such return.

2. In a ratchet adjuster for a variable speed drive having an adjusting shaft, a ratchet wheel on said shaft, and means for selectively rotating said ratchet wheel in either direction comprising a pair of individual pawl carriers, each pivotally mounted for limited oscillation, pawls pivoted thereto, spring means biasing said pawl carriers to normal positions thereof, a solenoid for each pawl carrier for moving it from its normal position to its opposite limit of movement and ratcheting its pawl past the teeth of said ratchet wheel during such movement, said spring means returning said pawl carriers to said normal positions upon de-energization of said solenoids and effecting movement of said ratchet wheel by said pawls during such return, and freely pivoted rocker means engageable with said pawl carriers and constituting an interlock between them, said means being rocked by one of said pawl carriers when its solenoid is energized to prevent actuation of the other pawl carrier.

References Cited in the file of this patent

UNITED STATES PATENTS

| | | |
|---|---|---|
| 1,426,718 | Florez | Aug. 22, 1922 |
| 1,446,267 | Newcomb | Feb. 20, 1923 |
| 1,849,971 | Baughan | Mar. 15, 1932 |
| 2,351,694 | Morrison | June 20, 1944 |
| 2,477,599 | Hammann | Aug. 2, 1949 |
| 2,558,953 | Henninger | July 3, 1951 |
| 2,694,805 | Jordan | Nov. 16, 1954 |
| 2,851,619 | Jones | Sept. 9, 1958 |